W. W. GROOM.
Cotton Planter.

No. 101,232.

Patented March 29, 1870.

WITNESSES
Jno. T. Brooks
Alex. F. Roberts

Inventor:
Wm. W. Groom
PER
Attorneys.

United States Patent Office.

WILLIAM W. CROOM, OF GAINESVILLE, ALABAMA,

Letters Patent No. 101,232, dated March 29, 1870.

IMPROVED COTTON-SEED PLANTER, &c.

The Schedule referred to in these Letters Patent and making part of the same.

To all whom it may concern:

Be it known that I, WILLIAM W. CROOM, of Gainesville, in the county of Sumter and State of Alabama, have invented a new and useful Improvement in Cotton-seed Planters, &c.; and I do hereby declare that the following is a full, clear, and exact description thereof, which will enable others skilled in the art to make and use the same, reference being had to the accompanying drawings forming part of this specification, in which—

Similar letters of reference indicate corresponding parts.

My invention has for its object to furnish an improved machine for planting and fertilizing cotton-seed, which shall be so constructed and arranged as to drop the seed regularly and uniformly, and not in clumps, and which may be easily adjusted for planting Indian corn, sorghum, peas, &c., doing its work accurately and well in either capacity; and It consists in the construction and combination of various parts of the machine, as hereinafter more fully described.

A is the frame of the machine.

Figure 1:
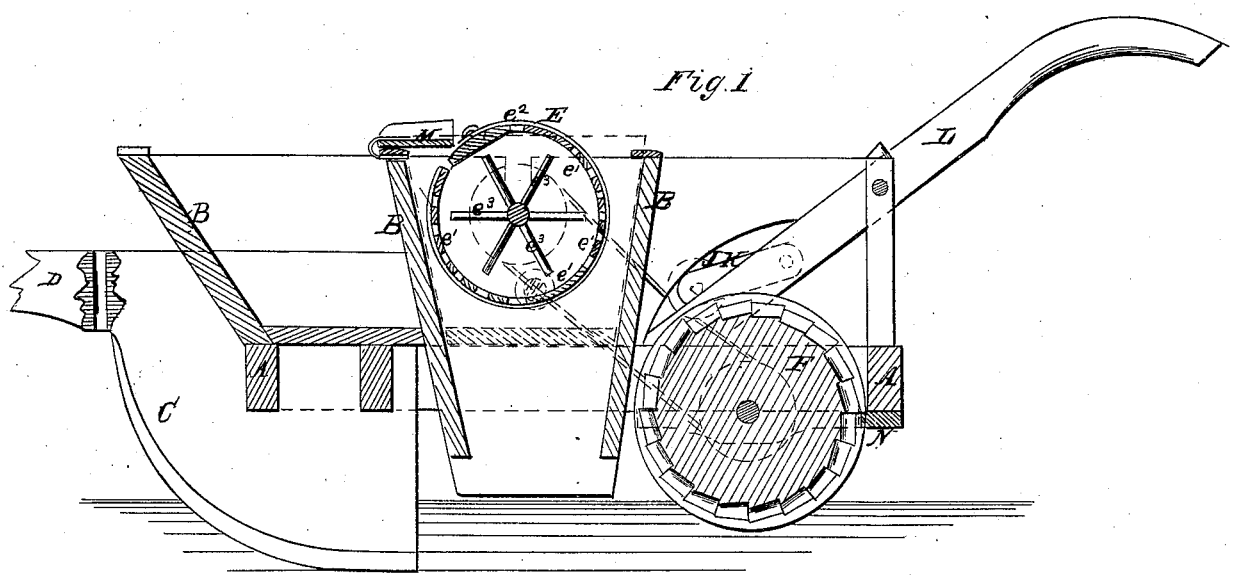
Figure 1 is a vertical longirudinal section of my improved machine, taken through the line $xx$, fig. 2.
Figure 2:
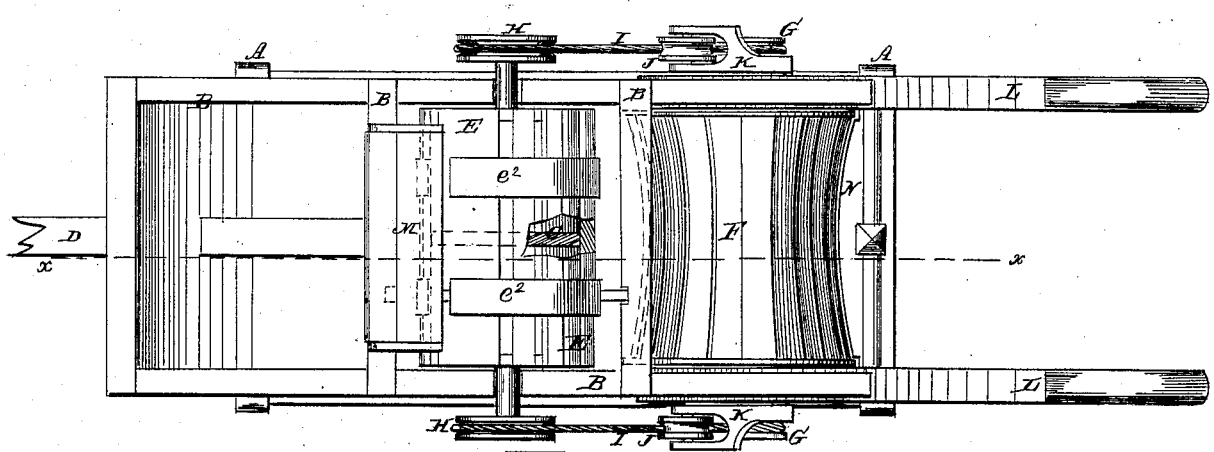
Figure 2 is a top view of the same.
Figure 3:
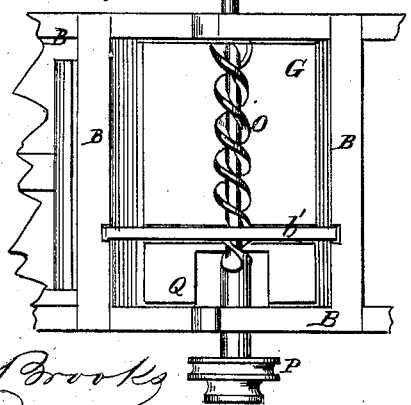
Figure 3 is a detail-top view of the middle part of the same, adjusted for planting other seeds.

B is the box, which is securely attached to the frame A, and which is divided into two parts by a partition, as shown in fig. 1.

The forward part or compartment of the box B is designed to carry a supply of seed or of the fertilizer, and the rear compartment is designed to receive the dropping device.

The rear compartment of the box B is made hopper-shaped, is extended below the frame A, and in its bottom is formed a long narrow opening, running longitudinally with the machine, through which the seed passes into the furrow opened by the opener C, which is attached to or formed solid with the beam D, and the lower and front edges of which are beveled off, and may be shod with thin metal plates.

If desired, a colter may be attached to the beam D in front of the opener C, but usually this will not be necessary.

E is the dropping-cylinder, which is formed by attaching slats $e'$, some of which should be made wider than the others, to two disks attached to a shaft.

One of the slats $e'$ is loose, to serve as a door, being hinged to its place by being attached to cloth bands $e^2$ passed around the cylinder.

The bands $e^2$ may be varied in breadth, and serve to regulate the escape of the seed from the cylinder E.

$e^3$ are radial arms attached to the shaft of the cylinder E, and which serve to stir up the cotton-seed, and, in connection with the edges of the slats $e'$, to separate it, and cause it to escape regularly and uniformly from the said cylinder E.

The cylinder E is divided into two compartments by a third disk, so that the cotton-seed may be placed in one compartment and the fertilizer in the other, and both may be distributed at the same time and by the same operation.

As the seed escapes into the furrow formed by the opener C, it is covered by the roller F, the journals of which revolve in bearings attached to the rear part of the frame A.

The roller F is concaved, is corrugated longitudinally, and has flanges, projecting two inches, more or less, formed upon or attached to its ends. This construction enables it to take a firm hold upon the ground, so as to revolve the dropping-cylinder.

To the ends of the journals of the roller F are attached pulleys G, around which, and around the pulleys H, attached to the ends of the shaft of the cylinder E, pass the bands I, which are kept taut by the idlers J, pivoted to the lower ends of arms K, the upper ends of which are pivoted to the handles L or to some other convenient part of the machine.

M is a board hinged to the partition of the box B, which, when filling the cylinder E, may be turned into the position shown in fig. 1, to serve as an apron to prevent the scattering of the seed or fertilizer while being transferred to the said cylinder.

N is a plate attached to the rear part of the frame A, the forward edge of which is rounded off to correspond with the concavity of the roller F, to serve as a scraper to remove any soil that may adhere to it.

Having thus described my invention,

I claim as new and desire to secure by Letters Patent—

1. The dropping-cylinder E $e^1$ $e^2$ $e^3$, in combination with the box B and opener C, substantially as herein shown and described and for the purpose set forth.

2. The concaved, corrugated, and flanged covering-roller F, in combination with the box B and dropping device, substantially as herein shown and described, and for the purpose set forth.

WM. W. CROOM.

Witnesses:
STEPHENS CROOM,
H. D. LONG.